(12) United States Patent
Yaacoby et al.

(10) Patent No.: US 11,916,916 B2
(45) Date of Patent: Feb. 27, 2024

(54) SYSTEM AND METHOD FOR AUTHENTICATING, STORING, RETRIEVING, AND VERIFYING DOCUMENTS

(71) Applicants: Eli Yaacoby, Greenwich, CT (US); Liwen Yaacoby, Greenwich, CT (US)

(72) Inventors: Eli Yaacoby, Greenwich, CT (US); Liwen Yaacoby, Greenwich, CT (US)

(73) Assignee: Wymsical, Inc., Greenwich, CT (US)

( * ) Notice: Subject to any disclaimer, the term of this patent is extended or adjusted under 35 U.S.C. 154(b) by 121 days.

(21) Appl. No.: 17/239,625

(22) Filed: Apr. 25, 2021

(65) Prior Publication Data

US 2021/0250359 A1 Aug. 12, 2021

Related U.S. Application Data

(63) Continuation-in-part of application No. 16/432,787, filed on Jun. 5, 2019, now Pat. No. 10,992,683, which
(Continued)

(51) Int. Cl.
*H04L 29/00* (2006.01)
*H04L 9/40* (2022.01)
(Continued)

(52) U.S. Cl.
CPC ............ *H04L 63/102* (2013.01); *G06F 16/93* (2019.01); *G06F 21/36* (2013.01);
(Continued)

(58) Field of Classification Search
CPC . H04L 63/102; H04L 63/0428; H04L 63/083; H04L 63/0435; H04L 2463/062;
(Continued)

(56) References Cited

U.S. PATENT DOCUMENTS

| | | |
|---|---|---|
| 5,426,700 A | 6/1995 | Berson |
| 5,615,268 A | 3/1997 | Bisbee et al. |

(Continued)

FOREIGN PATENT DOCUMENTS

| | | | | |
|---|---|---|---|---|
| CN | 103544452 A | * | 1/2014 | ............. G06F 21/34 |
| CN | 105074721 A | * | 11/2015 | ............. G06F 21/36 |
| WO | WO-2015028438 A1 | * | 3/2015 | ............. G06F 16/93 |

*Primary Examiner* — Don G Zhao
(74) *Attorney, Agent, or Firm* — UConn IP Law Clinic; Henry Zinn; Julie Ludwig

(57) ABSTRACT

Disclosed herein is a computer-implemented method for preparation of an electronic document with a plurality of signing users, comprising associating an unsigned, encrypted document with at least a first authenticated user code for a first signing user and a second authenticated user code for a second signing user, sending the document to the signing users, decrypting the document; generating a first electronic signature from the first signing user's authenticated user code and a second electronic signature from the second signing user's authenticated user code, appending signatures to the document, duplicating the document and assigning ownership separately for each signing user, encrypting each signed document, and transferring the signed and encrypted documents to electronic vaults associated with the signing users.

5 Claims, 12 Drawing Sheets

Related U.S. Application Data is a continuation of application No. 15/171,246, filed on Jun. 2, 2016, now Pat. No. 10,341,353.

(60) Provisional application No. 62/170,943, filed on Jun. 4, 2015.

(51) Int. Cl.
*G06F 21/62* (2013.01)
*G06F 16/93* (2019.01)
*G06F 21/36* (2013.01)

(52) U.S. Cl.
CPC ...... *G06F 21/6218* (2013.01); *H04L 63/0428* (2013.01); *H04L 63/083* (2013.01)

(58) Field of Classification Search
CPC ...... G06F 16/93; G06F 21/36; G06F 21/6218; G06F 2221/2107; H04W 12/77
See application file for complete search history.

(56) References Cited

U.S. PATENT DOCUMENTS

| | | | |
|---|---|---|---|
| 6,178,510 B1 | 1/2001 | O'Connor et al. | |
| 6,515,988 B1 * | 2/2003 | Eldridge | G06F 15/0225 709/217 |
| 6,732,090 B2 | 5/2004 | Shanahan | |
| 6,944,770 B2 | 9/2005 | Henderson et al. | |
| 7,359,881 B2 * | 4/2008 | Stefik | G06Q 30/0283 375/E7.009 |
| 7,826,076 B2 | 11/2010 | Manchala | |
| 8,341,141 B2 | 12/2012 | Krislov | |
| 9,519,802 B2 * | 12/2016 | Dutta | G06F 21/602 |
| 9,866,393 B1 * | 1/2018 | Rush | H04L 9/3236 |
| 9,948,630 B2 * | 4/2018 | Moran | H04L 63/08 |
| 10,110,385 B1 * | 10/2018 | Rush | H04L 9/3234 |
| 2002/0083008 A1 | 6/2002 | Smith | |
| 2003/0154406 A1 | 8/2003 | Honarvar | |
| 2005/0149450 A1 | 7/2005 | Stefik | |
| 2006/0259948 A1 * | 11/2006 | Calow | G06F 21/6218 726/1 |
| 2007/0061881 A1 | 3/2007 | Eyre | |
| 2007/0136600 A1 | 6/2007 | Wilkinson et al. | |
| 2008/0294899 A1 * | 11/2008 | Gazzetta | G06F 21/6245 713/170 |
| 2009/0320095 A1 | 12/2009 | Nanda | |
| 2011/0126008 A1 * | 5/2011 | Song | G06F 21/6218 726/28 |
| 2012/0096342 A1 * | 4/2012 | Wang | G06F 16/93 715/234 |
| 2012/0284602 A1 * | 11/2012 | Seed | G06Q 20/3274 715/224 |
| 2012/0331108 A1 | 12/2012 | Ferdowsi | |
| 2013/0262333 A1 | 10/2013 | Wicker | |
| 2014/0019766 A1 * | 1/2014 | Takahashi | H04L 9/3231 713/176 |
| 2014/0258123 A1 | 9/2014 | Fernandes | |
| 2014/0279825 A1 | 9/2014 | Shukla | |
| 2015/0022844 A1 * | 1/2015 | Balinsky | H04N 1/4426 358/1.14 |
| 2015/0177938 A1 | 6/2015 | Kleinpeter | |
| 2016/0005036 A1 | 1/2016 | Tervo | |
| 2016/0171192 A1 * | 6/2016 | Holz | G06F 21/6245 726/19 |
| 2016/0224526 A1 * | 8/2016 | Gazit | G06F 9/3017 |
| 2016/0299876 A1 * | 10/2016 | New | H04L 9/3247 |

* cited by examiner

SYSTEM AND METHOD FOR AUTHENTICATING, STORING, RETRIEVING, AND VERIFYING DOCUMENTS

CROSS-REFERENCE TO RELATED APPLICATIONS

This application depends from and claims priority to U.S. Non-Provisional application Ser. No. 16/432,787 filed Jun. 5, 2019, now U.S. Pat. No. 10,992,683, which is a continuation of U.S. Non-Provisional application Ser. No. 15/171,246 filed Jun. 2, 2016, now U.S. Pat. No. 10,341,353, which in turn claims priority from U.S. Provisional Application No. 62/170,943 filed Jun. 4, 2015, by Eli Yaacoby and Liwen Yaacoby, entitled "System and Method for Authenticating, Storing, Retrieving, and Verifying Documents", the entire contents of which are incorporated herein by reference.

FIELD OF THE INVENTION

The present invention relates generally to document authenticating, storing, retrieving, and verification systems and methods.

BACKGROUND OF THE INVENTION

The present disclosure generally relates to a system, method and process to authenticate, store, retrieve, and verify documents belonging to an entity.

Throughout history and even more so today the ability to replicate and forge documents creates significant problems in transactions requiring, for example, documentary proof of identity, financial records, employment history, or citizenship. Transactions depend on the ability to authenticate and verify these important documents. Today, individuals, companies, universities, agencies and various other entities are troubled when solely relying on physical documents such as a passport or birth certificate to confirm an identity or other information represented by the document. Additionally, as systems that used to require one to deliver a copy or an original of a document to complete a process such as securing a loan or applying to college move to complete electronic based filing systems the need to authenticate documents in various and changing forms is rapidly growing.

A person seeking, for example, a loan may be required to provide proof of income documents, banks account status, forms of identification, and employment verification documents. In some cases, a person would need to provide such documents with a seal of authenticity from the issuing agency. This may require a person to request the same document many times and even provide updated versions from time to time as information changes. The bank or mortgage agency, in the case of securing a loan, needs to allocate time, personnel, and money in order to properly and securely authenticate the one or more documents involved in each transaction. In addition to these processes being costly and time consuming for the third party, they also open themselves up to the mishandling of documents and exposure of personal information to numerous personnel during the transaction process.

To increase security and improve document authentication efficiency computer systems and processes for encrypting and storing documents have been contemplated. Throughout history, various encryption/decryption schemes have been developed that, at least for a time were thought to be secure only to discover that the security was able to be compromised as encryption/decryption keys were passed from one system to another. Consequently, there is a need to centralize the storage, authentication and verification of documents to improve security and efficiency of authenticating documents. Thus, there is a need for systems and methods that overcome the above and other disadvantages.

SUMMARY OF THE INVENTION

The invention relates to a method for authentication, validation, storage, and third party verification of a user's documents, comprises authenticating a user, where authentication requires the user to register with a document service, and providing to the document service personal information of the user, in exchange for which the user receives an unauthenticated code, which the user then presents in person with a photo identification to an ID station associated with the document service which uploads the unauthenticated code and photo identification at the document service and associates it with the user's personal information, the document service then generating a validation code and sending it to the user for presentation to the ID station, whereby presentation of the validation code to the ID station causes the document service to generate an authenticated user code, the authenticated user code then being sent to the user; associating a document with the authenticated user code; transferring the document associated with the authenticated user code from a document source to an electronic vault owned by the document service when requested by the user; verifying the document by receipt of the authenticated user code with the document source, or by independent data; encrypting and securely storing the document so that control of sending or viewing the document remains with the user; storing metadata and encryption data associated with the document at the document service; having the document service verify the authentication of the document in response to a request by a third party and confirm that the document is valid, by the user sending the authenticated user code to the document service, the document service sending a hyperlink to the third party, and upon the third party clicking on the hyperlink permission is requested from the user for the document service to allow the document or metadata for the document to be viewed by the third party, and upon receiving permission from the owner, the document or metadata is viewable by the third party.

In addition, the invention relates to a method for authentication, validation, storage, and third party verification of a user's documents comprises authenticating a user, where authentication requires the user to register with a document service, and providing to the document service personal information of the user, in exchange for which the user receives an unauthenticated code, which the user then presents in person with a photo identification to an ID station associated with the document service which uploads the unauthenticated code and photo identification at the document service and associates it with the user's personal information, the document service then generating a validation code and sending it to the user for presentation to the ID station, whereby presentation of the validation code to the ID station causes the document service to generate an authenticated user code, the authenticated user code then being sent to the user; associating a document with the authenticated user code; transferring the document associated with the authenticated user code from a document source to an electronic vault owned by the document service when requested by the user; verifying the document by receipt of the authenticated user code, with the document source, or by independent data; encrypting and securely storing the document so that control of sending or viewing the document remains with the user; and storing metadata and encryption data associated with the document at the document service.

The invention also relates to a method for authentication, validation, storage, and third party verification of a user's documents comprises a document source provides a document to a document service; a user registers for a user vault account with a document service, wherein the user provides an ID station authority with one or more picture IDs and an email address, and the document service provides the user with a validation code when the ID station authority uploads the one or more picture IDs to the document service; the document service creates a user vault account when the validation code is entered by the ID station authority; the document service encrypts and stores the document in the user vault account; the document source provides the user with an authentic document code; a third party requests verification of a document stored with the documentation service, wherein the third party provides the authentic document code provided by a user to the document service; the document service retrieves the document requested for verification; the document service decrypts the document; the document service determines whether the user needs to approve third party access to the document requested for verification; and the document service provides document access to the third party.

A further embodiment is a computer-implemented method for authentication, validation, storage, and third party verification of a user's documents, the computer-implemented method comprising authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user. The method also comprises associating a document with the authenticated user code; transferring, by a third computer, a digital document associated with the authenticated user code from a document source to an electronic vault for the user when requested by the user, wherein the digital document comprises a digital version of the document associated with the authenticated user code; and verifying, by the second computer, the document by receipt of the authenticated user code with the document source, or by independent data. The method also includes encrypting and securely storing the digital document so that control of sending or viewing the digital document remains with the user; storing metadata and encryption data associated with the document at the document service; and having the document service verify the authentication of the digital document in response to a request by a third party and confirm that the digital document is valid, by the user sending, by the network, the authenticated user code to the document service, the document service sending a computerized hyperlink to the third party, and upon the third party clicking on the computerized hyperlink permission is requested from the user for the document service to allow the digital document or metadata for the document to be viewed by the third party, and upon receiving, by the network, permission from the owner, the digital document or metadata is viewable by the third party.

Another embodiment is a computer-implemented method for authentication, validation, storage, and third party verification of a user's documents, the computer-implemented method comprising authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user. The method also includes associating a document with the authenticated user code; transferring, by a third computer, a digital document associated with the authenticated user code from a document source to an electronic vault for the user when requested by the user, wherein the digital document comprises a digital version of the document associated with the authenticated user code; verifying, by the second computer, the document by receipt of the authenticated user code with the document source, or by independent data; encrypting and securely storing the digital document so that control of sending or viewing the digital document remains with the user; and storing metadata and encryption data associated with the document at the document service.

Another embodiment disclosed herein is a method for preparation of an electronic document, comprising associating an unsigned document with an a first authenticated user code for a first signing user and a second authenticated user code for a second signing user, sending the unsigned document to the first signing user and the second signing user for signature, after the first signing user and the second signing user have accepted the document, decrypting the document, obtaining electronic signatures of the first signing user and the second signing user on the document, encrypting the signed document with a first key associated with the first signing party and a second key associated with a second signing party, and transferring the signed and encrypted document to a storage computer or an electronic vault.

Another embodiment disclosed herein is a computer-implemented method for preparation of an electronic document with a plurality of signing users, comprising associating an unsigned, encrypted document with at least a first authenticated user code for a first signing user and a second authenticated user code for a second signing user; sending the unsigned, encrypted document to the first signing user and the second signing user; decrypting the document with stored client keys corresponding to the first and second signing users after the first and second signing users have accepted the unsigned document; generating a first electronic signature from the first signing user's authenticated user code and a second electronic signature from the second signing user's authenticated user code; appending the first and second electronic signatures to the document corresponding to each signing user, wherein the first and second electronic signatures may be represented by visible images, visible codes, or embedded metadata; duplicating the document and assigning ownership separately for each signing user; encrypting each signed document with its owner's client key; and transferring the signed and encrypted documents to electronic vaults associated with the first and second signing users.

A further embodiment disclosed herein is a computer-implemented method for preparation of an electronic document with a single signing user, comprising associating an unsigned, encrypted document with an authenticated user code of a signing user; sending the unsigned, encrypted document to the signing user; decrypting the document with a client key corresponding to the signing user after the signing user has accepted the unsigned document; generating an electronic signature from the signing user's authenticated user code; appending the electronic signature data to the document, wherein the signature may be represented by visible images(s), visible codes(s), or embedded metadata; encrypting the signed document with the client key corresponding with the signing user; and transferring the signed and encrypted document to the user's electronic vault.

A computer-implemented method for preparation of an electronic document with a plurality of signing users, comprising associating an unsigned, encrypted document with at least a first authenticated user code for a first signing user and a second authenticated user code for a second signing user; sending the unsigned, encrypted document to the first signing user and the second signing user; decrypting the document with stored client keys corresponding to the first and second signing users after the first and second signing users have accepted the unsigned document; generating an electronic signature from the first signing user's authenticated user code and the second signing user's authenticated user code; appending the electronic signature data corresponding to each signing user to the document, wherein the signature may be represented by visible image(s), visible code(s), or embedded metadata; assigning ownership of the document; encrypting the signed document with the client keys of the first signing user and second signing user; and transferring the signed and encrypted document to the users' electronic vaults.

BRIEF DESCRIPTION OF THE DRAWINGS

Referring now to the figures, which are exemplary embodiments, and wherein the like elements are numbered alike.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It should be noted that the terms "first," "second," and "third," and the like may be used herein to modify elements performing similar and/or analogous functions. These modifiers do not imply a spatial, sequential, or hierarchical order to the modified elements unless specifically stated.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein. A system and method for authenticating, storing, retrieving and verifying documents is provided.

Figure 1:
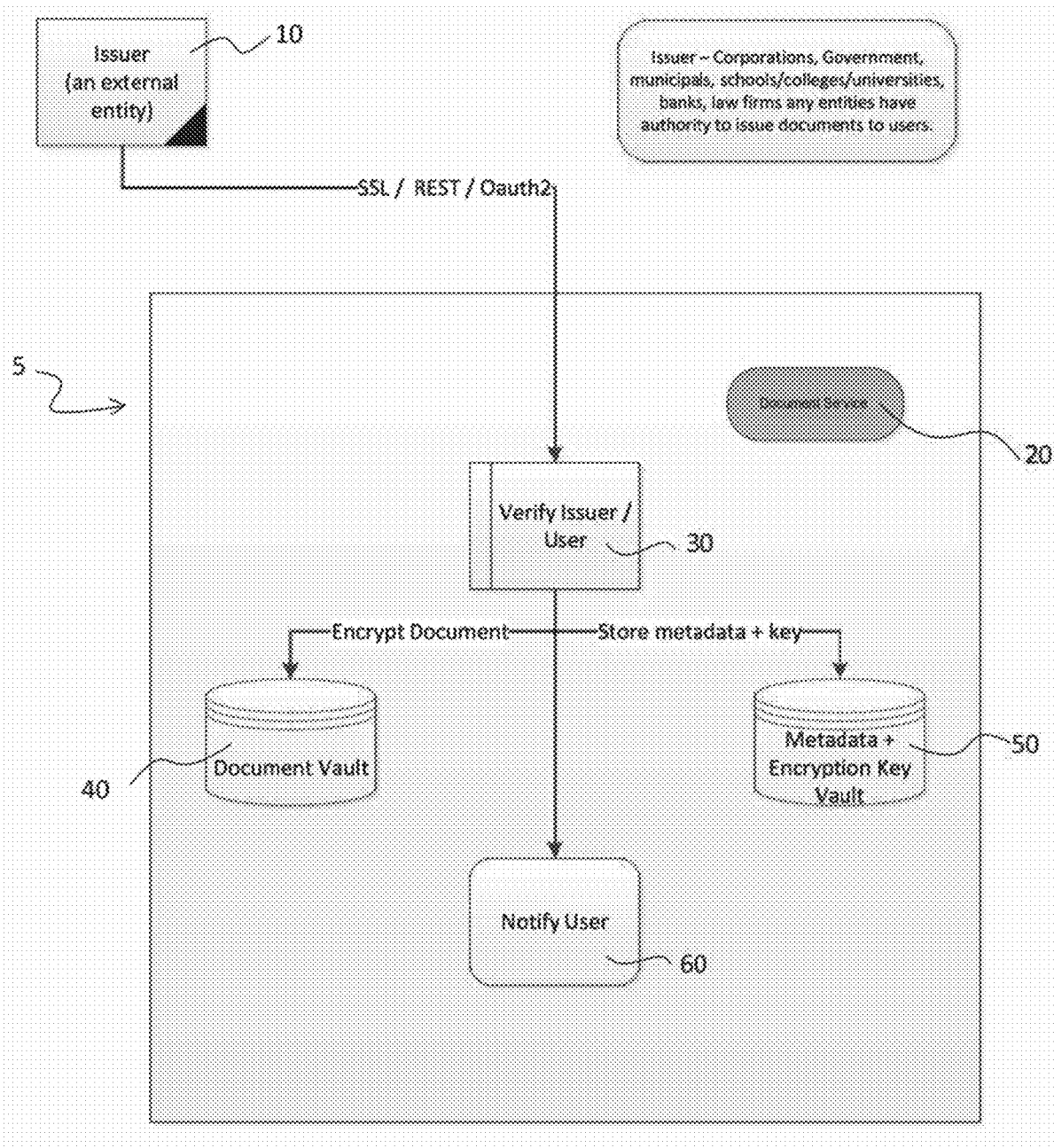
FIG. 1 is a schematic view of one embodiment of the disclosed system.

FIG. 1 is a schematic view of one embodiment of the disclosed system 5. An issuer is in communication with a document service 20. The document service may refer to any entity that provides the authenticating, storing, retrieving, and verifying document service to the user. Whenever "document service" is used in this patent application, it shall include any entity that provides or may provide authenticating, storing, retrieving, and verifying document service to the user, as well as any other entity that provides the listed services. The issuer 10 is generally any originator, creator, preparer, or other entity that may produce a document of import such as, but not limited to a college transcript, insurance policy, driver's license, passport, etc. Issuers may include, but are not limited to corporations, governments, municipalities, schools, colleges, universities, banks, law firms, and any entities, which have authority to issue documents to users. An issuer in some instances may also be the user. At act 30, the document service verifies that the issuer 10 is a legitimate party and further verifies that the user is also a legitimate party, and further verifies any documents issued by an issuer that the user has requested the document service to verify and store. At act 40, the document service 20 encrypts and stores a digital document in a document vault 41. At act 50 the document service 20 stores metadata about the document, user, and issuer, and other relevant information in a metadata and encryption key vault. In addition, at act 50, the document service 20 stores an encryption key for the document in the metadata and encryption key vault. At act 60, the user is notified that the document has been authenticated, verified, stored, and is ready for retrieval.

Figure 2:
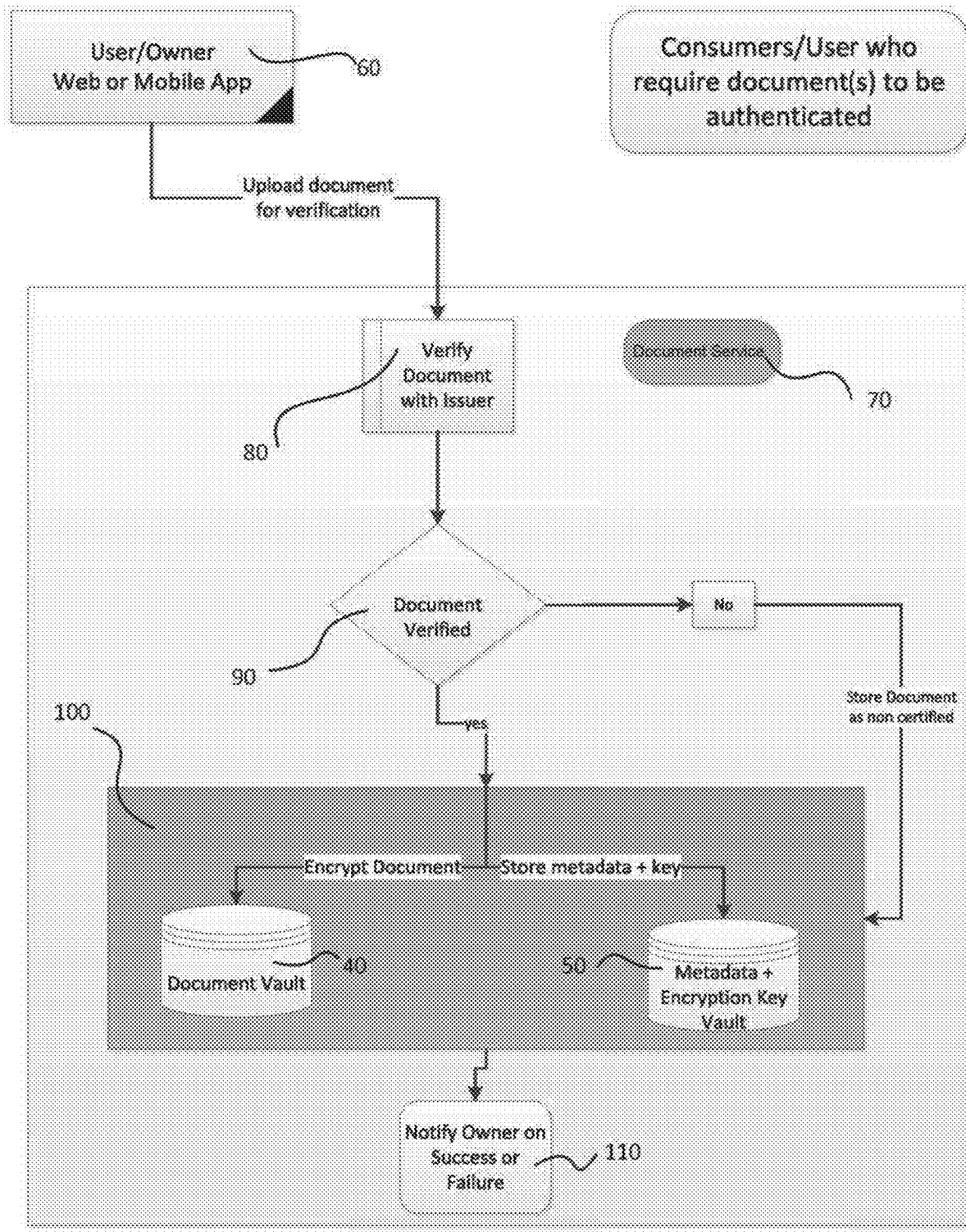
FIG. 2 is a schematic view of one embodiment showing how a user may communicate with the document service.

FIG. 2 is a schematic view of one embodiment showing how a user may communicate with the document service 70. A user 60 communicates with the document service via a network, such as the internet ("web") or mobile app. The user may upload a document for verification to the document service 70. Once the document service 70 receives the document, the document service 70 verifies the document with the issuer at act 80. Act 80 may include the document service 70 having pre-arranged relationships set up with various issuers to streamline the verification step, for example the document service 70 may have access to databases maintained by issuer and be able to verify the document by accessing the database, or by making queries through the internet to the issuer, and/or the document service 70 may communicate directly with issuer to verify the document. At query 90, the document service 70 determines whether the document is verified. If not verified, the document may be encrypted and stored, at act 100, as a non-certified document in the document vault. Further, at act 100, metadata about the non-certified document, user, issuer, and other relevant information may be stored in the metadata and encryption key vault. Still at act 100, the encryption key for the non-certified document may be stored in the metadata and encryption key vault. If verified at query 90, then the verified document may be encrypted and stored at act 100 in the document vault. In addition, at act 100, metadata about the document, user, issuer, and other relevant information may be stored in the metadata and encryption key vault. Further, at act 100, the encryption key for the document may be stored in the metadata and encryption key vault. The document service, at act 110, notifies the owner of a successful storage of an encrypted document or a failure thus only a storage of a non-certified document.

Figure 3:
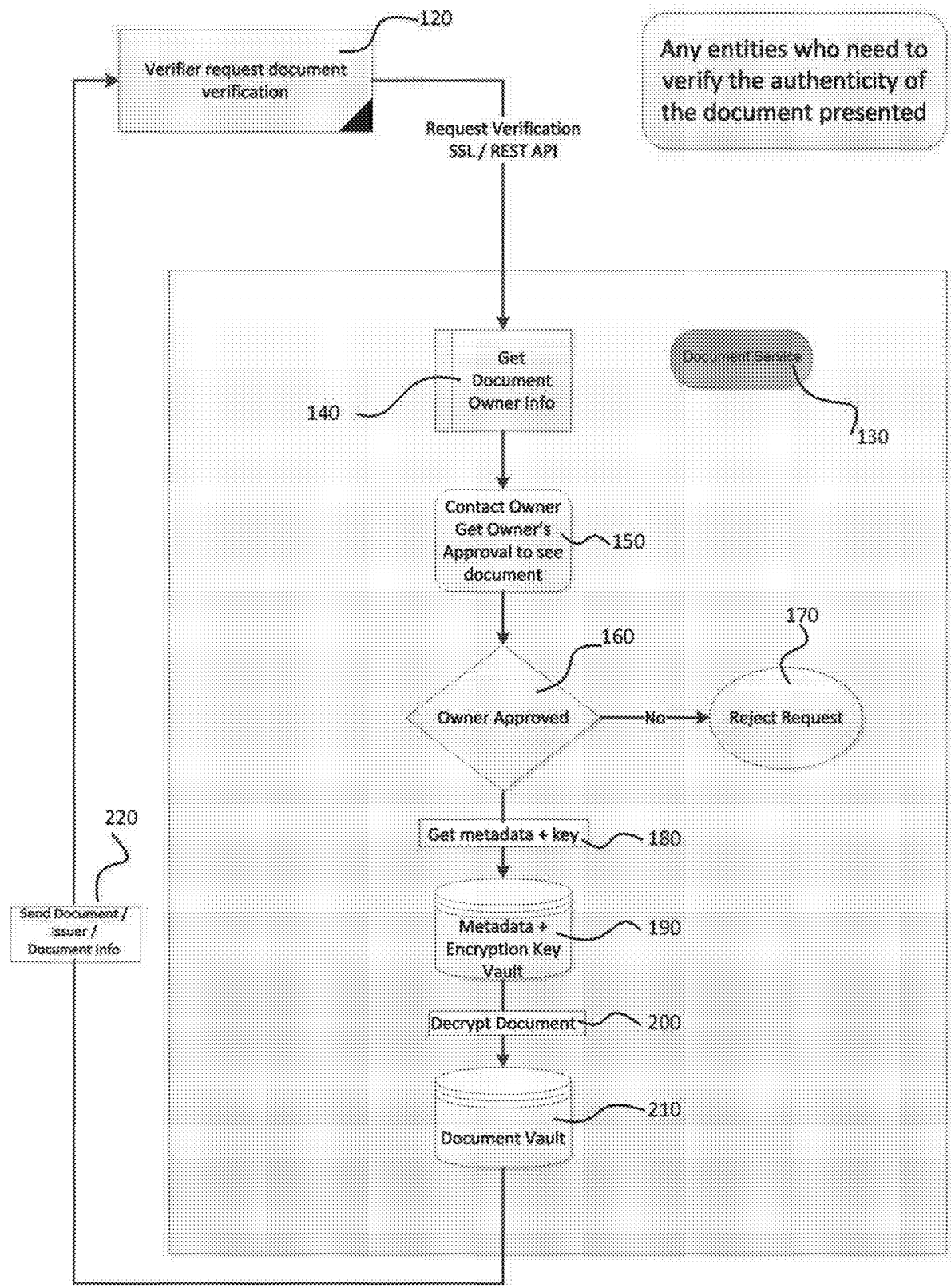
FIG. 3 is a schematic diagram showing how a verifier is able to get verification of documents.

FIG. 3 is a schematic diagram showing how a verifier is able to get verification of documents. At act 120, a verifier requests document verification from the document service 130. At act 140, the document service 130 obtains document owner information. At act 150, the document service 130 contacts the document owner, and seeks to obtain approval from owner to allow verification of the document and to allow viewing of the document. At query 160, if the owner does not approve, then the verification request is rejected at 170. If the owner does approve, then at act 180 the metadata and encryption key for the document is retrieved by the document service 130 from the metadata and encryption key vault 190. At act 200, the document is retrieved from document vault 210 and decrypted, and is sent to the verifier as a verified document.

Figure 4:
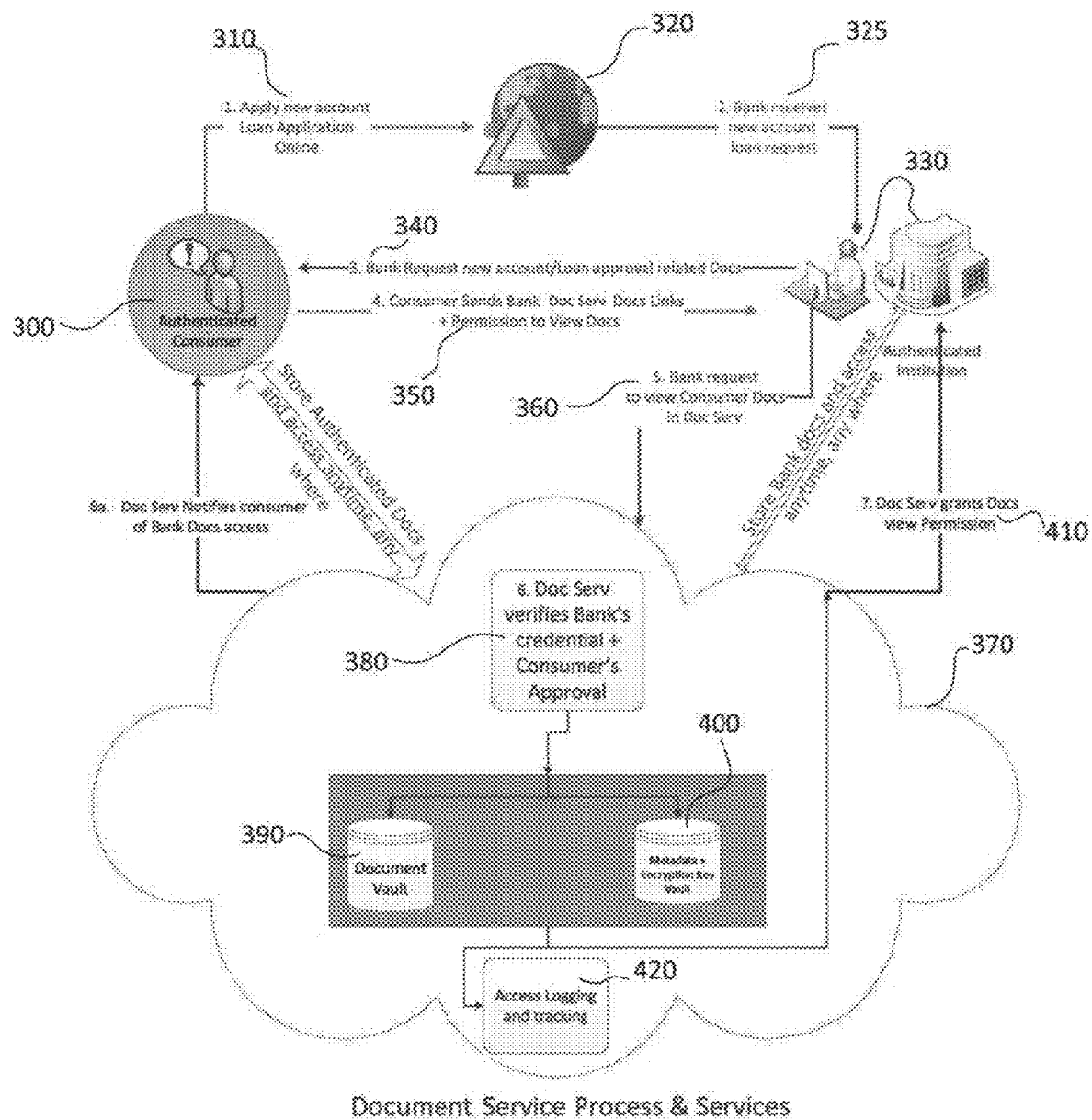
FIG. 4 is a schematic diagram showing an embodiment of the disclosed system when used for a new account/loan application.

FIG. 4 is a schematic diagram showing an embodiment of the disclosed system when used for a new account/loan application. Of course, one of ordinary skill in the art will recognize that the disclosed system and method for authenticating, storing, retrieving, and verifying documents can be used in many other applications, such as, but not limited to: a verifier (e.g., a government representative) verifying the identification card of an owner, a verifier verifying current insurance of an owner, an educational institution verifying a transcript of an owner, or other entities needing to verify a document of an owner. An authenticated user 300, also may be referred to as an owner or user, is shown applying for a new account and/or loan online via an internet 320 at act 310. The verifier 330 (the bank in this example) receives the new account and loan request at act 325. At act 340, the bank requests new account and loan approval documents from the owner 300. At act 350, the consumer sends the bank 330 the document service documents links and permission to view documents. At act 360, the verifier (bank) 330 requests to view the documents from the document service 370. At act 380, the document service 370 verifies the verifier's credentials, and obtains the owner's approval to make the documents available to the verifier 330. Once owner's approval is received by the document service 370, the document service 370 accesses the document vault 390 and metadata and encryption key vault 400, in order to provide document access to the verifier 330 at act 410. The document service 370 will log and track access information of all documents at act 420.

Figure 5:
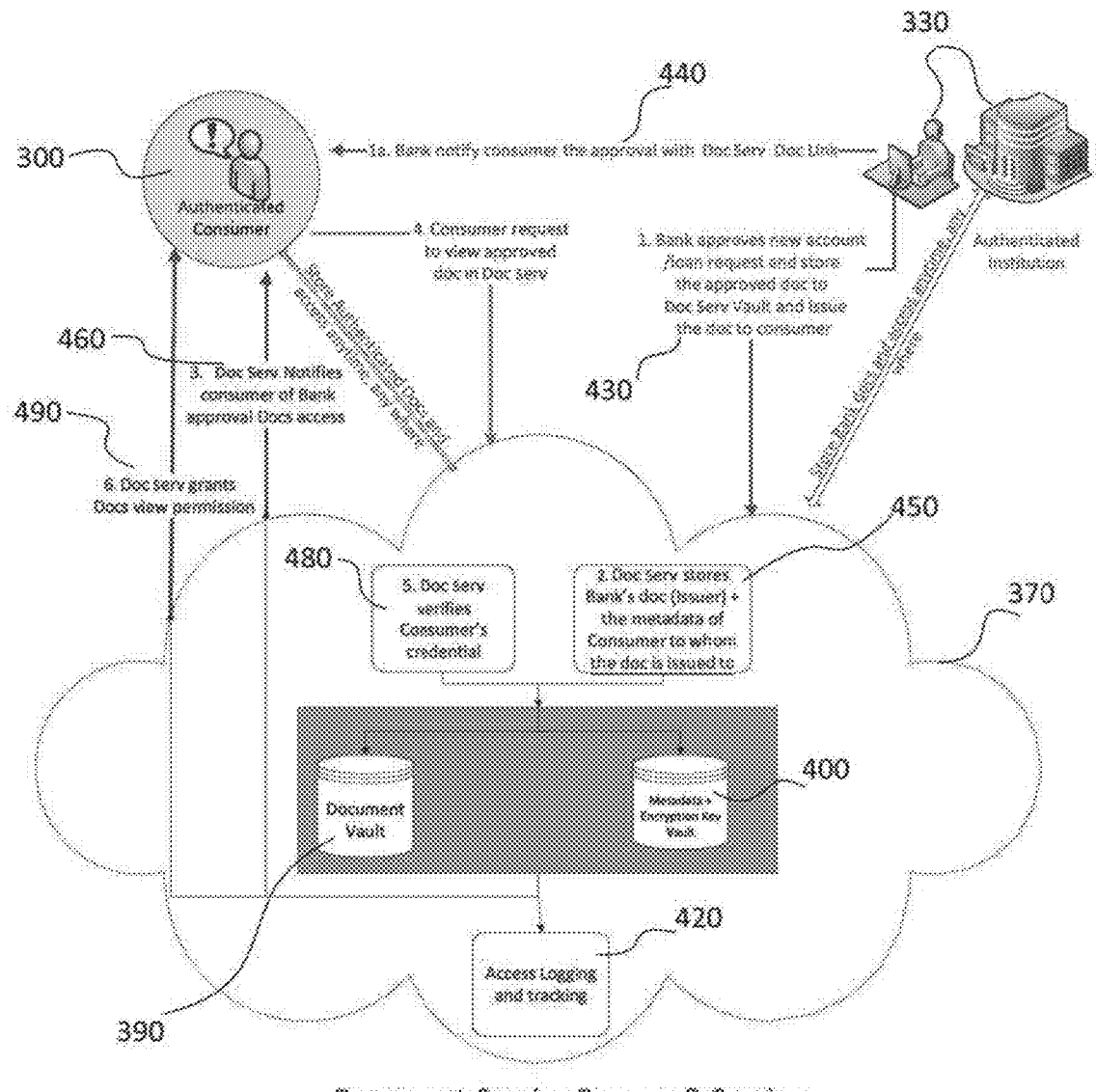
FIG. 5 is a schematic diagram that continues from FIG. 4.

FIG. 5 is a schematic diagram that may continue from FIG. 4. At act 430, the bank approves the new account and loan request, stores the approval document to the document service Vault 390, and issues the document to the owner (consumer) 300. In this example the once verifier (i.e. bank) has now become an issuer of new documents to the owner. At act 440, the verifier 330 (bank) notifies the owner 300 (consumer) that the loan was approved by sending a link to the approval document. At act 450, the document service 370 stores the verifier's (bank) approval document and metadata of owner (consumer) 300 to whom the approval document is issued to, in the document vault 390 and the metadata and encryption key vault 400. At act 460, the document service 370 notifies the owner (consumer) 300 that access is now available to the issuer's/bank's approval documents. At act 470, the consumer 300 requests viewing of the approval document, the document being located in the document service network. At act 480, the document service 370 verifies the consumer's credentials before allowing the consumer to view the bank approval documents. At act 490, the document service 370 grants the owner (consumer) 300 permission to view the approval documents.

Figure 6A:
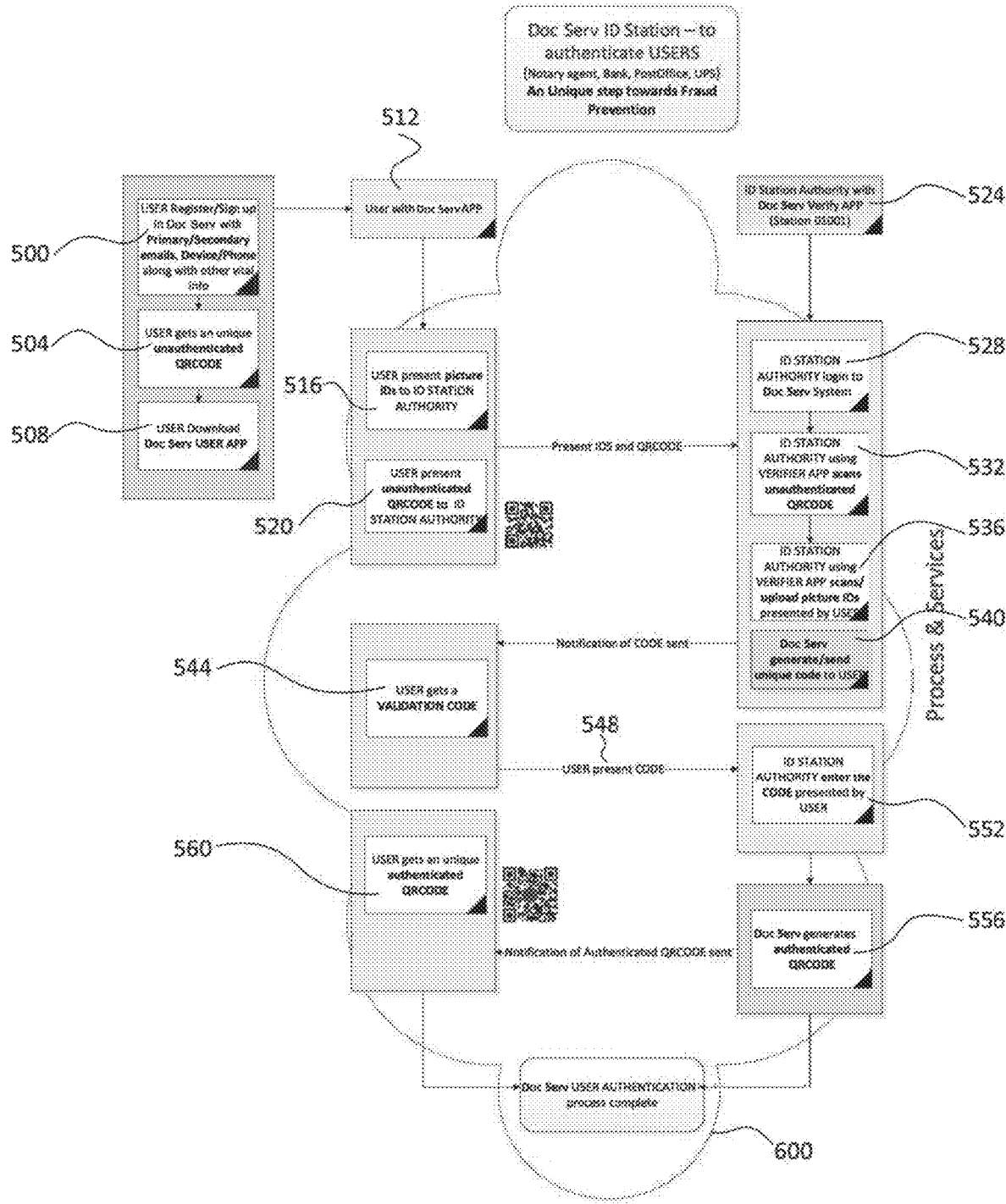
FIG. 6A is a schematic diagram showing the document service ID station system.

FIG. 6A is a schematic diagram showing the document service ID station system. At act 500, the user registers and signs up with the document service 600, by providing the user's information, such as Primary/Secondary emails, Device ID/Phone Number, along with other information. At act 504, the user obtains a unique unauthenticated code, for example a QRcode, from the document service 600. At act 508, the user may download a document service user application (app) on a user computer 509, such as a smart device. User now has the app on his smart device at act 512. At act 516, the user presents a picture ID to an ID station authority. At act 520, the user presents the unauthenticated QRcode to the ID station authority, optionally via his smart device and using the document service app. At act 524, the ID station authority verifies that the user downloaded the document service app. At act 528, the ID station authority logs into the document service network using an ID station computer 529. At act 532, the ID station authority using a verifier app scans the unauthenticated QRcode presented by the user. At act 536, the ID station authority scans and uploads one or more picture IDs presented by the user on the ID station computer 529 by using the verifier app. At act 540, the document service 600 generates and sends a unique code validation code to the user using a document service computer 541. At act 544, the user receives the validation code from the document service 600. The user presents the code to the ID station authority at act 548. At act 552, the ID station authority enters the code presented by the user into the document service computer 541 in the document service system. At act 556, the document service generates an authenticated QRcode. At act 560, the user receives the authenticated QRcode from the document service 600.

Figure 6B:
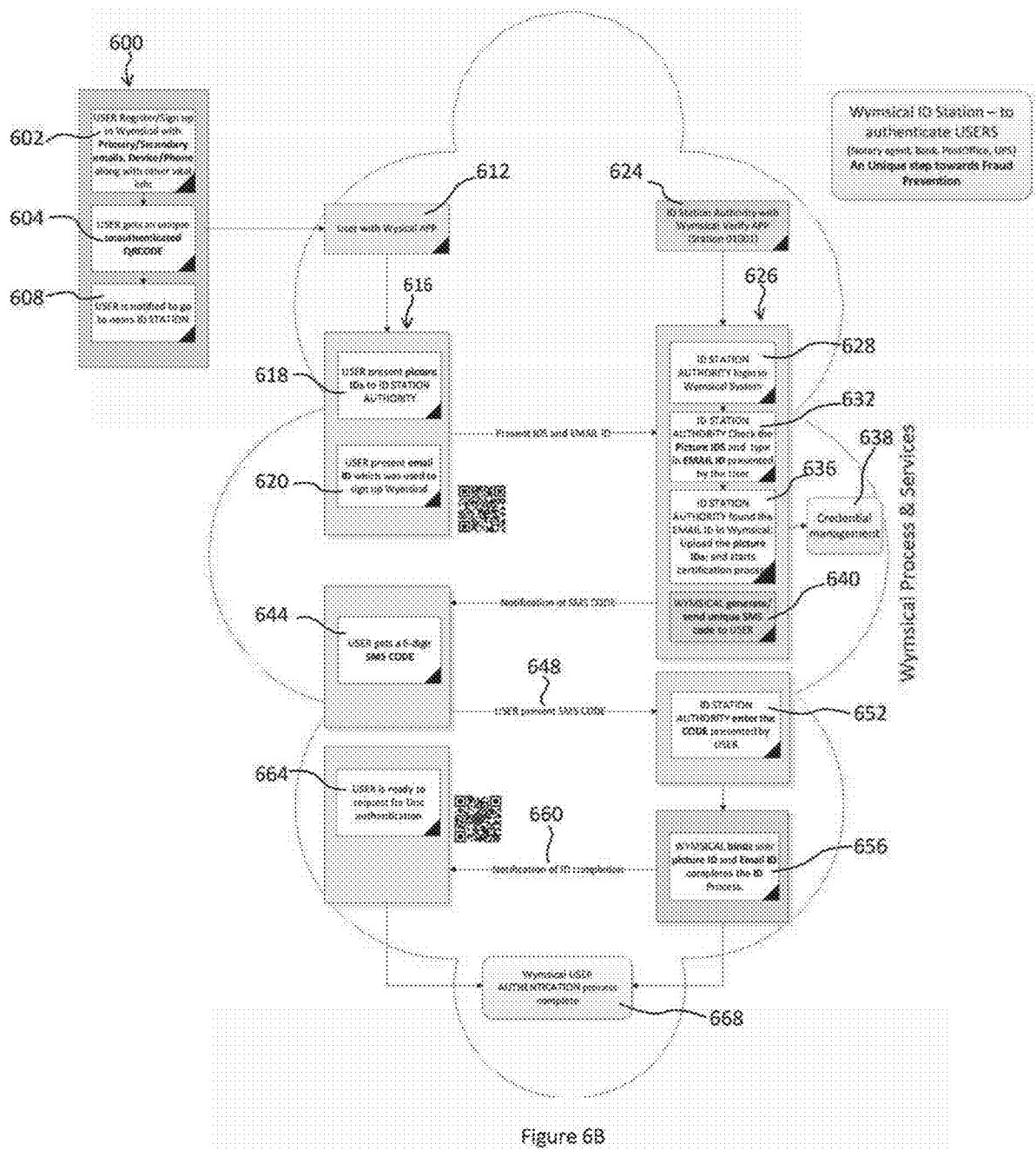
FIG. 6B is an exemplary user authentication process between a user, an ID station authority and a document service.

FIG. 6B depicts an exemplary user authentication process between a user, an ID station authority and a document service. This process may be completed through an application based on a device, phone, computer system or other implementation apparatus that is known to one skilled in the art. Similarly, this process may be completed in part on a network-connected device and in part in person at a physical location such as an ID station authority. In an embodiment, a document service and ID station authority may include Wymsical™ products and services. According to the authentication process in FIG. 6B, a user initiates registration with Wymsical™, as depicted in act 600. During the registration process, a user, at act 602, provides Wymsical™ with registration information comprising a primary email, a secondary email, device information, a phone number or other vital information required to establish themselves as a user and to create a Wymsical™ vault account. At act 604, Wymsical™ provides the user a unique unauthenticated QRcode. Additionally, Wymsical™ provides the user with a notification to proceed to an ID station authority. An ID station authority may include a physical location such as a notary agent, bank, post office, ups or other designated locations. An ID station may also include an online-based location.

Equipped with the Wymsical™ APP 612, a user may initiate communication with an ID station authority, act 616. A user may present one or more picture IDs to an ID station authority, act 618. The Wymsical™ system may require one or more forms of picture ID to complete the user authentication process. The user may also, at act 616, provide an email address, act 620, used during registration 600. Equipped with the Wymsical™ Verify APP 624, the ID station authority accesses the Wymsical™ system, act 628. At act 632, the ID station authority checks the information provided by the user, which may include the provided picture ID and email address with the Wymsical™ system. Wymsical™ systems may include or be interconnected with a credential management system 638 for checking picture IDs, email addresses, and other registration information to authenticate the user. Once the ID station authority finds the email address and optionally other registration information in the Wymsical™ system, act 636, a certification process is initiated. Wymsical™ generates and sends a unique SMS code to the user, at act 640. The user receives the unique SMS code, at act 644, and presents the unique SMS code to the ID station authority at act 648. The ID station authority enters the presented unique SMS code at act 652, and when valid Wymsical™ binds the picture IDs and email address, and optionally other user registration information, at act 656 to complete the user authentication at act 668. Wymsical™ also may send the user a notification 660 that ID confirmation is complete. Completion of the ID authentication permits the user to begin document acceptance and authentication 664 into a user vault. A vault may be a database. In other embodiments, the vault may be a combination of meta data fields that describe the document, the issuer, and/or the owner. The document blob may include meta data and encryption information that help the decryption of the document.

Figure 7:
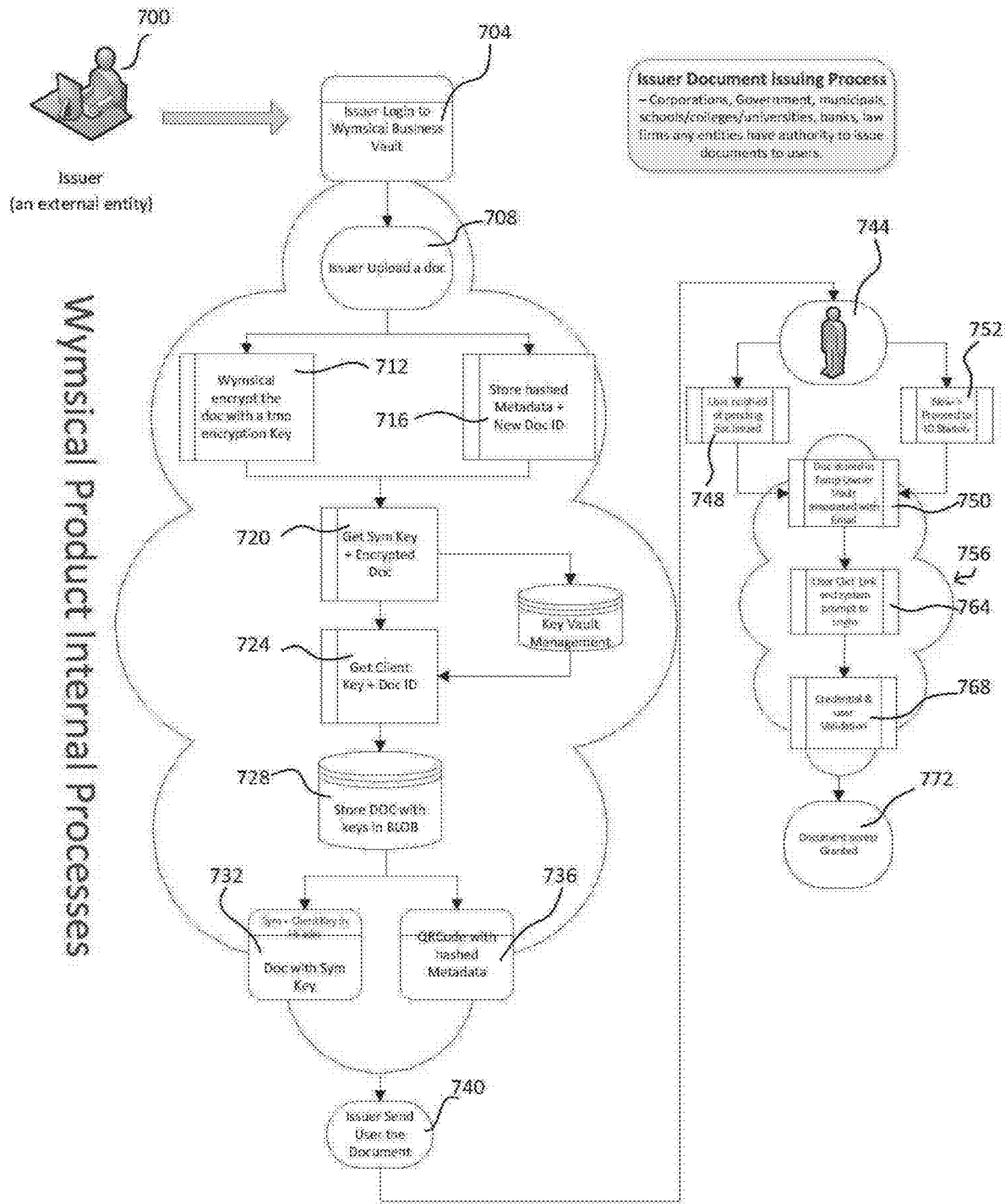
FIG. 7 is an exemplary Wymsical™ system process depicting the issuance of a document from an issuer to a user and into a user's Wymsical™ vault account.

In a further embodiment, referring to FIG. 7, an exemplary Wymsical™ system includes a process for an issuer to issue a document to a user and a user's Wymsical™ vault account. To accomplish this an issuer 700 logs into Wymsical™ Business Vault 704. The issuer selects a document to upload and uploads the document at act 708 to the Wymsical™ system using a document source computer 709. The Wymsical™ system preforms at least two tasks on an uploaded document. At act 712, the Wymsical™ system encrypts the document with a temporary encryption key. Additionally, at act 716, the Wymsical™ system stores hashed metadata and a new document ID. At act 720, the symmetric-key, "Sym Key" and the encrypted document are retrieved. At act 724, the Client Key and document key are retrieved. The keys may be managed in a key management vault 722. The document, Sym Key and Client Key are stored as a binary large object, "BLOB," at act 728. Upon completion of a document upload to the Wymsical™ system, the uploaded document is stored with the Sym Key including the Sym Key and Client Key in the header at act 732 along with an authenticated document code including the hashed metadata, such as a QRcode at act 736.

The issuer 700 may now send the document to the user 744, act 740. Depending on whether the user 744 is a registered Wymsical™ system user, a user may be prompted to enter the acceptance process of the document into their established document vault, act 748 or be prompted to become an authenticated user at act 752. An embodiment of the authentication process may include the process referred to in FIG. 6B and subsequently similarly described. Once a user is authenticated, they may begin accepting documents into their Wymsical™ Vault Account. However, should the user 744 already have an authenticated Wymsical™ Vault Account they may proceed with document acceptance 756. An issued document pending user acceptance is stored in a temporary owner vault associated by an email address, act 750. The user may optionally click a link provided by the document service, which will prompt their login, act 764. At act 768, the user's credentials are validated. Once validated the document is granted access into the user's Wymsical™ Vault, at act 772.

Figure 8:
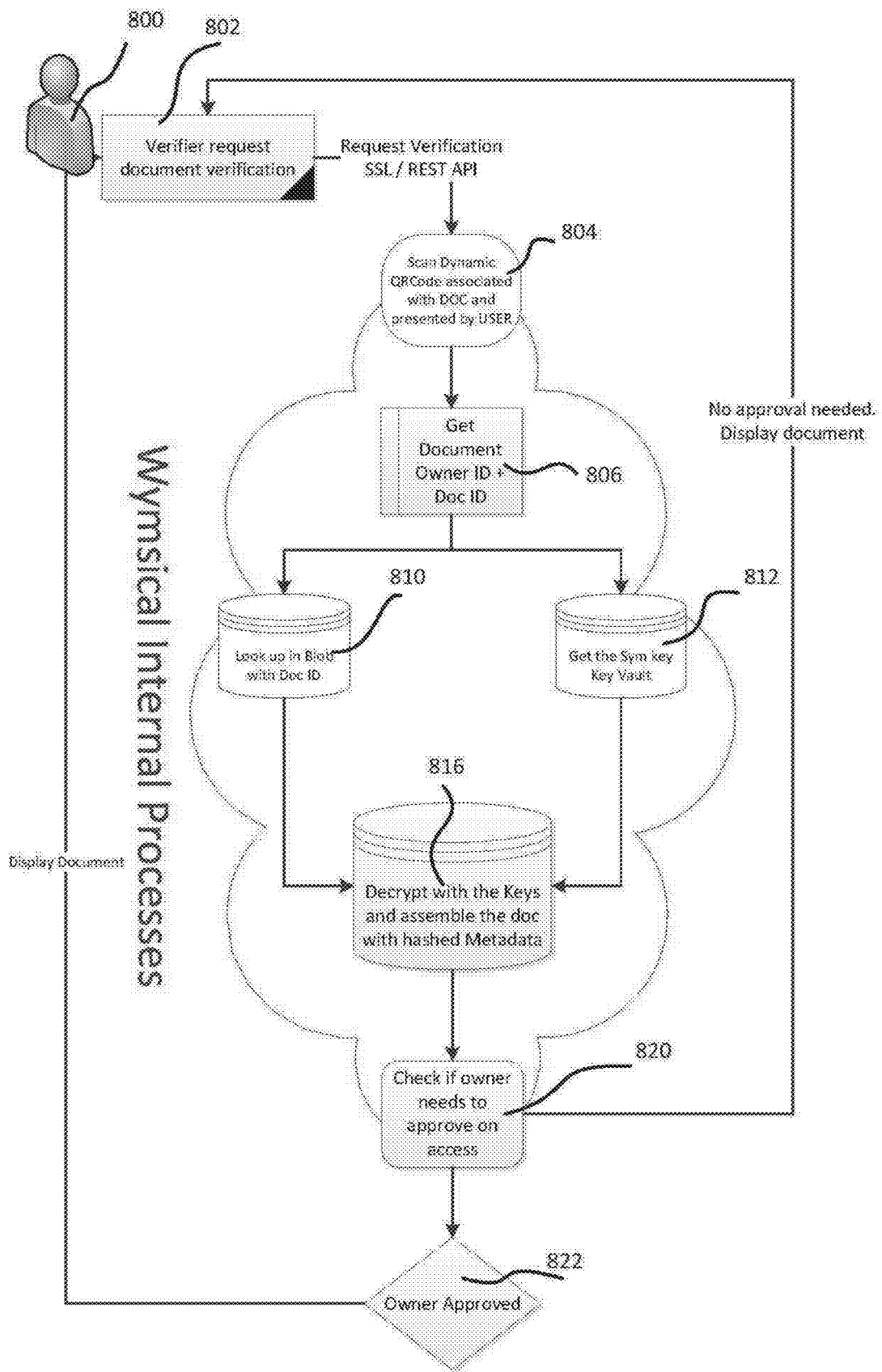
FIG. 8 is an exemplary process implemented in the Wymsical™ system for providing verification of a document of a user to a verifier.

In yet another embodiment of the Wymsical™ system, referring now to FIG. 8, a verifier 800 may request verification of a document of a user. FIG. 8 depicts an exemplary process implemented in the Wymsical™ system for providing verification of a document of a user to a verifier. Act 802, a verifier 800 may request verification of a document. In embodiments, the verifier 800 uses a third party computer 803. In an embodiment, at act 804, a verifier may scan a dynamic QRcode associated to a particular document presented by a user. The dynamic QRcode is an example of an authenticated document code a user may provide to a verifier when the verifier is seeking verification of authenticity and validity of a document. The scanning of the dynamic QRcode triggers act 806 the retrieval of the document, owner ID and document ID. In response to requesting a verification either by scanning the dynamic QRcode or another method of request, the Wymsical™ system or document service may send a link, such as a hyperlink, to the requesting verifier. This link may directly provide access to viewing the document upon completion of the Wymsical™ system or document service retrieval process. Alternatively, the link may require the verifier to log into the Wymsical™ system or document service before providing the requested verification. Furthermore, the Wymsical™ system or document service may request a verifier provide an approval code from an owner or require the verifier wait until the owner has completed an independent authorization allowing the verifier access to the document stored with the Wymsical™ system or document service.

When a verifier makes a request, the Wymsical™ system at act 810 locates the document ID in BLOB and at act 812 retrieves the Sym Key from the Key Vault. With the Keys, the document is decrypted and the document is assembled with the hashed metadata, at act 816. At act 820, the Wymsical™ system checks whether the owner needs to approve access. If owner approval for access is required, the owner is notified and upon approval, the document is displayed to the verifier 800 through act 822. In an embodiment where the owner does not need to provide approval, the document is displayed to the verifier 800. This document verification process is for any entity who needs to verify the authenticity of a document presented.

Figure 9:
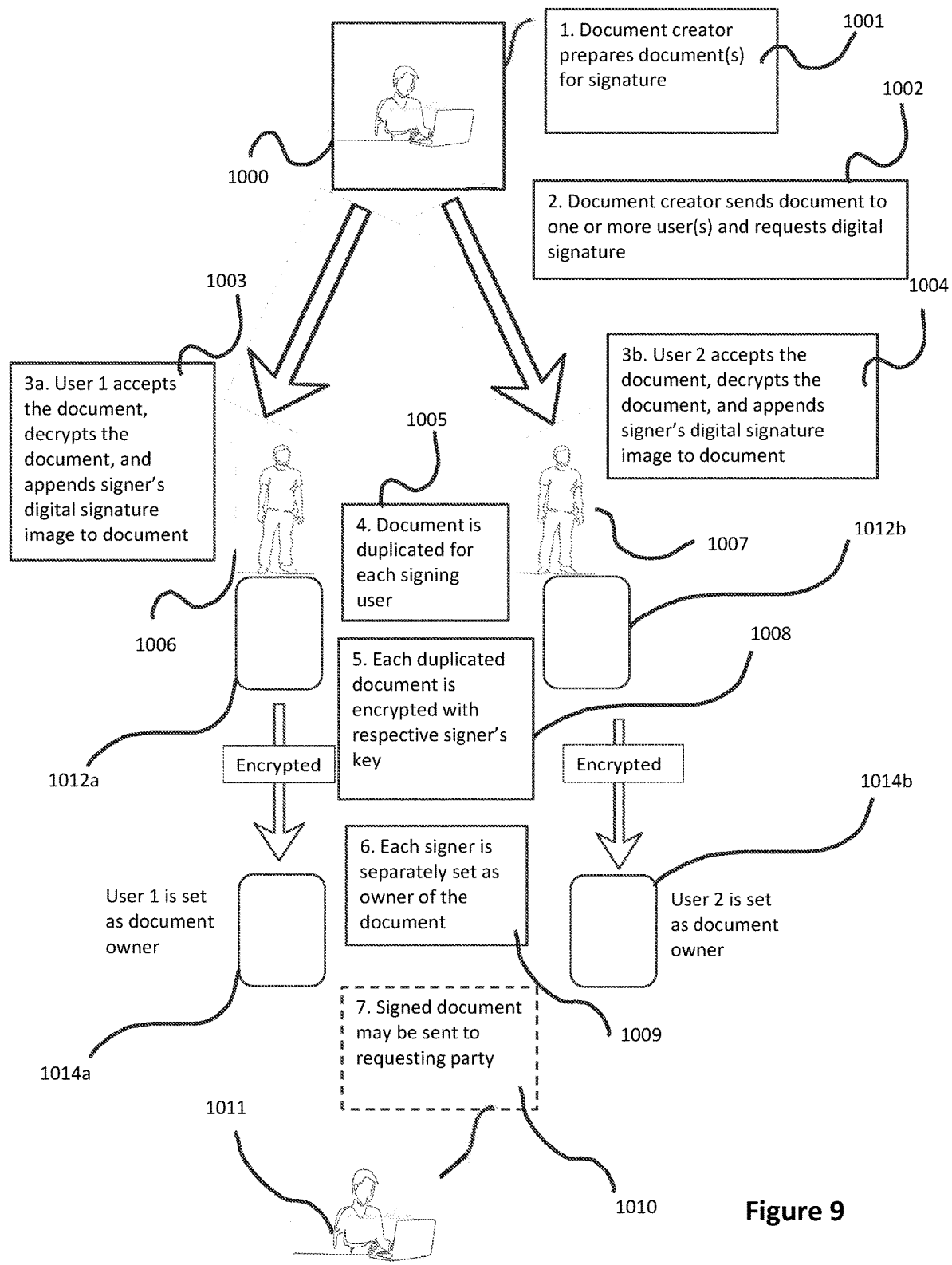
FIG. 9 is an exemplary system showing the interaction of the computers and electronic vault described herein.

FIG. 9 shows a system that includes computers described above. More specifically, FIG. 9 shows a document service computer 541 configured for electronic communication with a user's computer 509, a document source computer 709, a third party computer 803, and a user's electronic vault 41. The document service computer 541 is also configured for electronic communication with an ID station computer 529. In embodiments, the user's computer 509 communicates with the ID station computer 429.

In several embodiments, QRcodes are exemplary. A QRcode may be replaced with a bar code, numerical code, alphanumeric code, or other machine-readable code known in the art capable of enciphering data. Similarly, authenticated user codes or authenticated document codes disclosed herein may include, but are not limited to, a QRcode, bar code, numerical code, alphanumeric code, or other machine-readable code.

Included in many of the embodiments, a user, issuer, and verifier connect to the Wymsical™ system or similar document service. To maintain a secure transmission of information these connections may be completed using secure sockets layer, "SSL," to establish an encrypted link between the Wymsical™ system or similar document service and the user, issuer, or verifier. Without an SSL connection, any man in the middle can decode authorization codes from the header information passed over the connection. This is mainly because basic authentications in standard HTTP header use base64. Additionally, other standards for authentication may be used independently or in conjunction with SSL to pass authentication information. Some other standards for authentication may include, Oauth, Oauth2, REST API, or other standards known to one skilled in the art.

The disclosed system can authenticate, store, retrieve and verify essential personal documents anytime, anywhere via either Web or Mobile. The disclosed system can provide the user with a virtual vault of authenticated documents.

For any business, the disclosed system may make document protection, authentication and security exceptionally simple. Documents are kept secure and private using encryption both at rest and in transfer. Two keys may be required to unlock a document in the vault. With 10-layer, bank-grade security, confidential documents will not be lost, stolen or tampered with. The result is a dramatic reduction of operation costs and a significantly reduced instance of fraud.

The disclosed system can provide a virtual vault, which contains individual critical documents with encrypted document metadata. Owners can permission 3rd party of their choice to view the documents by sending a link with permission code anytime, anywhere. No authenticated document can be lost, stolen or tampered with.

The disclosed system offers real-time verification of a document's owner and issuer, as well as content authentication. It also eliminates the possibility of fraud. All the disclosed system requires may be a simple click of a link or a quick scan of a document presented by a user.

The disclosed system can provide authentication to any signed or personal document, not just those signed online. An owner can roam with his or her virtual vault containing all his/her authentic documents, which can be viewed and verified at anytime and anywhere. Authentication is not limited to the content of the document but includes the identity of the owner and of the issuer. Owner of the documents has full control over whom they give permissions to. Additionally, owners are notified immediately if any documents are being tempered or accessed without their permission before the document is actually being viewed.

The disclosed system is a one that may enable individual consumers, small businesses, companies, enterprises, institutions, governments, and other entities to have the ability to issue original/digital documents in a secure manner to users or another entity. Authenticated individuals who are the designated owner can access these documents from the system vault securely via web or mobile device. Third parties can easily verify a document's authenticity on a third party computer 803 by simply scanning the document's unique/encrypted code or by clicking document link and accessing or viewing the original document with permission of owner's approval all in a few simple clicks and a matter or moments.

In addition, a method is disclosed for obtaining verified signature images from users, referred to as signing users, wherein a document creator can send a document to one or more signing users, those signing users decrypt the document—contingent upon the acceptance of all signing users— and append a signature. The document may then be duplicated for each signer, and encrypted with the signer's unique key. The signers are assigned as owners of the document, and the document may optionally be sent to a requesting user. The method and associated system are shown in FIGS. 10-11.

Figure 10:
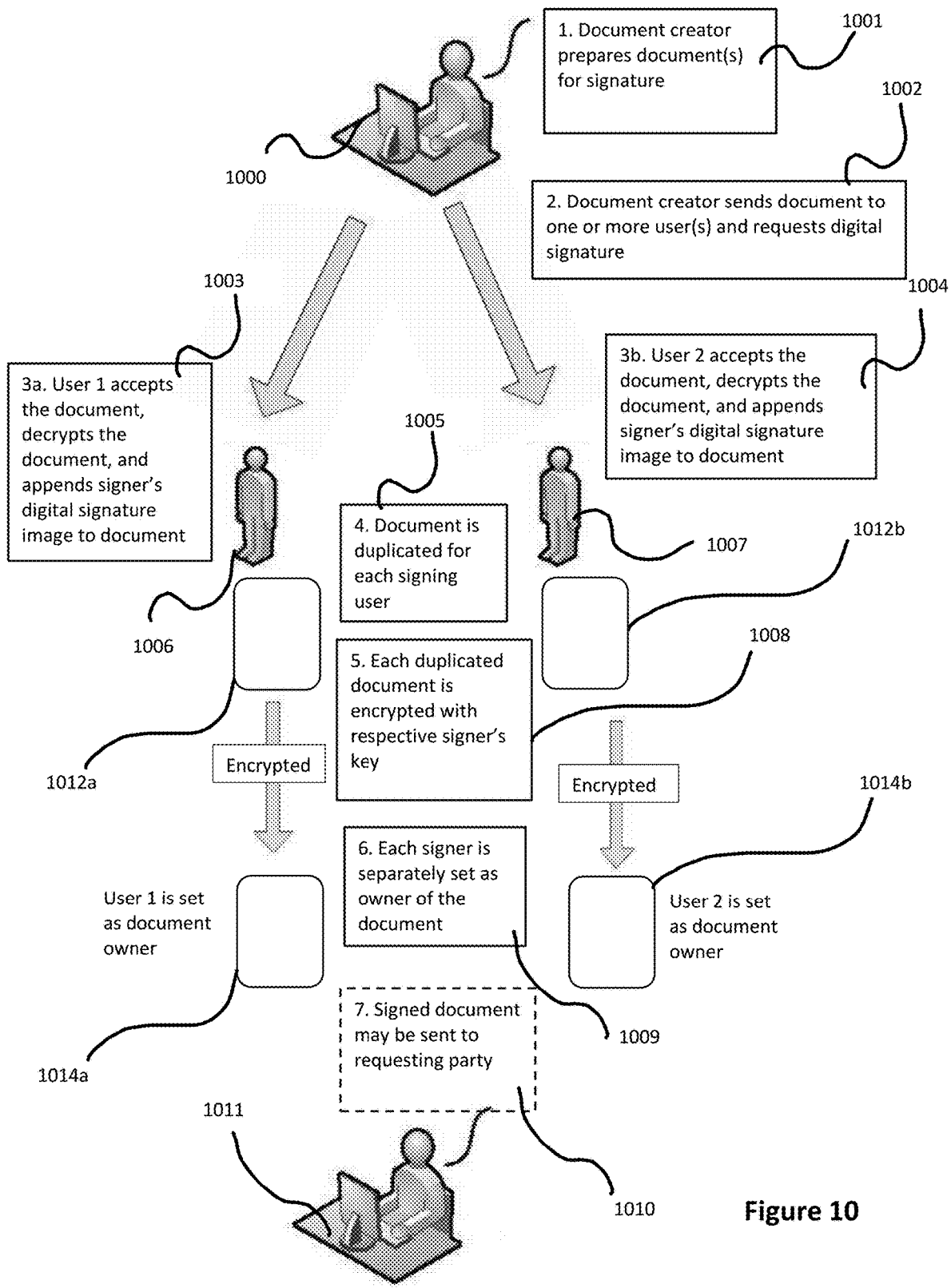
FIG. 10 is a schematic diagram showing how a verified document is created, sent, signed, and encrypted.

The disclosed system and method enable a document creator 1000 to create and send a document to one or more users to obtain digital signatures on the document, as depicted in FIG. 10. Act 1001 shows the document creator 1000 preparing a document for signature request. The document creator 1000 sends the document to the signing user(s) and requests digital signature 1002. The embodiment in FIG. 10 shows two signing users 1006 and 1007, though there could be greater or fewer than two signing users, as further described below. At acts 1003 and 1004, after the respective users 1006 and 1007 accept the document, the document is decrypted and the singing users' signature images are appended directly to the document. This decryption will not occur unless all signing users accept the document. At act 1005, the signed document is duplicated for each respective signing user 1006 and 1007. The duplicate document signed by the users and sent to user 1006 is shown in FIG. 10 as document 1012a, and the duplicate document signed by the users and sent to user 1007 is shown as document 1012b. Then, the signed documents 1012a and 1012b are each encrypted with their respective signer's key at act 1008. This key is unique to each signer. Act 1009 shows the signers of the document(s) being separately assigned as owners of the respective documents, 1014a and 1014b. At act 1010, the signed document may be sent to a party that wants the completed document. This embodiment shows the completed document being sent to a third party 1011. However, this party to whom the completed document is sent could also be the document creator 1000, or one or both of the signing users 1006, 1007.

Figure 11:
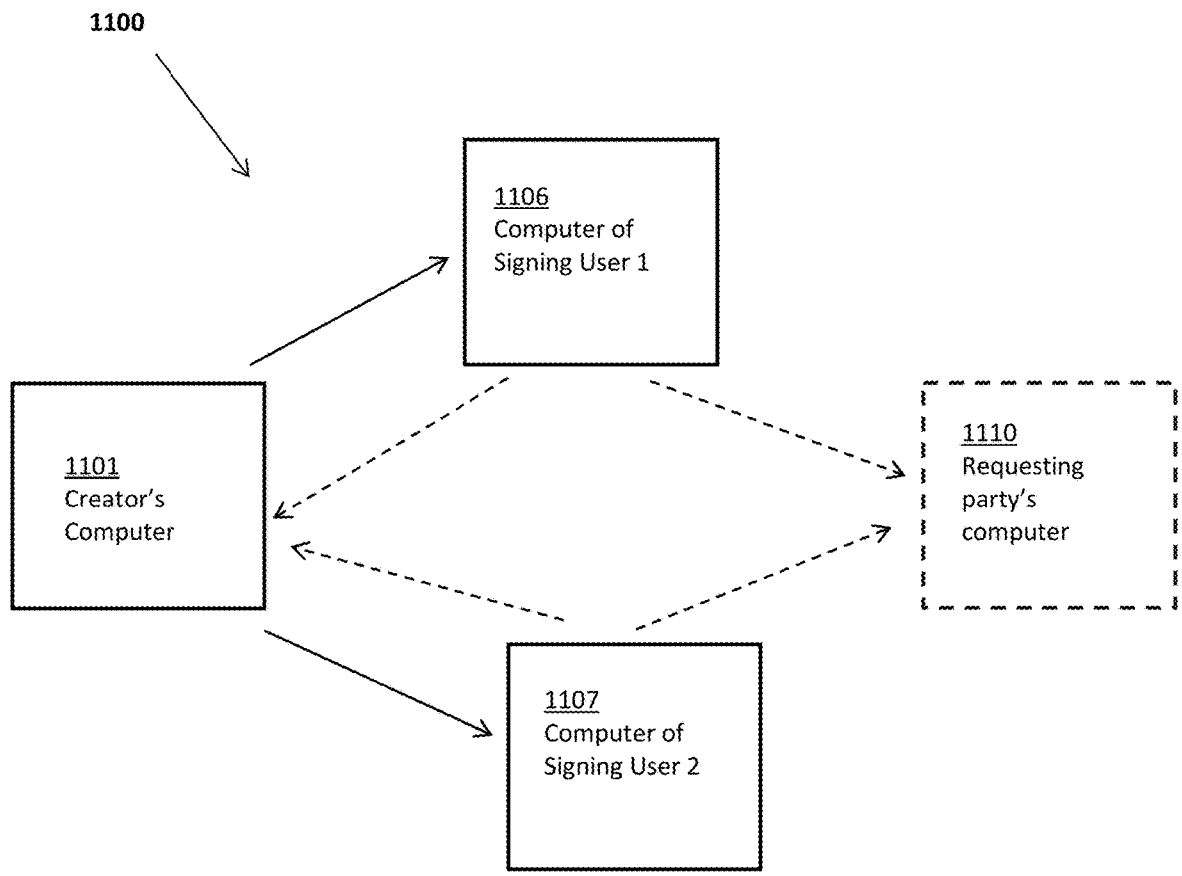
FIG. 11 is a hardware drawing showing the flow of a document from various user's computers.

Though FIGS. 10 and 11 each show two signing users 1006 and 1007, other embodiments could have only one signing user, while still other embodiments could have more than two signing users. For example, in the case of a tax accountant requiring a signature on a tax return, there may only be one signing user, though there could be more. This may also be the case at a DMV, where a DMV employee is asking for a signature of only one individual for purposes of a driver's license or other government document. In other embodiments, there may be three signing users; this may be the case in a situation where a bank is requesting signatures on a mortgage loan from two individuals buying a house together. In this banking context, the bank employee's signature and both future homeowners' signatures are needed on the document. Further, a law firm sending out a document for signatures may find an embodiment with four signing parties useful, if, for example, there are three lawyers' signatures and one client signature necessary in order to validate a legal document.

FIG. 11 shows a hardware system of one embodiment, generally designated as 1100. The system includes creator's computer 1101, and the computers of two signing users, namely computer 1106 and computer 1107. This embodiment also includes an optional requesting party's computer 1110. The authenticated document creator's computer 1100 sends the document to the first signing party's computer 1106 and the second signing party user's computer 1107. This figure shows two signing users, though there could be a single signing user or more than two users. The signed and encrypted document may then be sent to the requesting party's computer. The requesting party may be the document creator, in which case the signing users would send the document back to the creator's computer 1101. This may be the case if a bank generates a document, requests the signature of both parties, and then the document is sent back to the bank. However, the requesting party may also be one of the signing parties, in which case the computer of 1110 additionally executes the same functions as 1106 or 1007. Further, the requesting party's computer 1110 could also be a third party's computer. This may be the case where a bank generates a document, two parties sign it, and then send it to their lawyer.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The disclosed embodiments are illustrative, not restrictive.

The invention claimed is:

1. A computer-implemented method, comprising:
   associating an unsigned, encrypted document with at least a first authenticated user code for a first signing user and a second authenticated user code for a second signing user;
   sending the unsigned, encrypted document to the first signing user and the second signing user;
   decrypting the unsigned, encrypted document with stored client decryption keys corresponding to the first and second signing users after the first and second signing users have accepted the unsigned, encrypted document;
   generating a first electronic signature from the first authenticated user code for the first signing user and a second electronic signature from the second authenticated user code for the second signing user;
   appending the first and second electronic signatures to the decrypted, unsigned document corresponding to each signing user to produce a decrypted, signed document, wherein the first and second electronic signatures may be represented by visible images, visible codes, or embedded metadata;
   duplicating the decrypted signed document and assigning ownership of the duplicated, decrypted, signed document separately for each signing user;
   retrieving the first signing user's client encryption key from a first personal, individual, electronic vault containing the first signing user's encryption key and document metadata, and encrypting the first signing user's copy of the duplicated, signed document with the first signing user's client encryption key;
   retrieving the second signing user's client encryption key from a second personal, individual, electronic vault containing the second signing user's encryption key and document metadata, and encrypting the second signing user's copy of the duplicated, signed document with the second signing user's client encryption key, and
   transferring the encrypted, duplicated, signed document to a first electronic document vault associated with the first user and a second electronic document vault associated with the second user;
   wherein the first and second electronic document vaults are themselves encrypted and configured to provide safe storage at an electronic storage location hosted by a document service, and control of verification or viewing of the encrypted, duplicated, signed document in the first and second encrypted electronic document vaults requires authorization from at least one of the first signing user and the second signing user and the use of their respective client decryption key to allow the document service (a) to access the document, and (b) to display the document to a requesting third party, thereby allowing the requesting third party to view the electronic signature and use the electronic signature to verify the legitimacy of the document.

2. The method of claim 1, wherein each of the first and second electronic vaults is configured such that control of verification or viewing the encrypted, duplicated, signed document stored in the first and second electronic vaults requires authorization from both the first and second signing users.

3. A computer-implemented method, comprising:
associating an unsigned, encrypted document with an authenticated user code of a signing user;
sending the unsigned, encrypted document to the signing user;
decrypting the unsigned, encrypted document with a client decryption key corresponding to the signing user after the signing user has accepted the unsigned, encrypted document;
generating an electronic signature from the authenticated user code for the signing user;
appending the electronic signature to the decrypted, unsigned document to produce a decrypted, signed document, wherein the signature may be represented by visible images, visible codes, or embedded metadata;
retrieving a client encryption key from their personal, individual electronic vault containing the signing user's encryption key and metadata, encrypting the decrypted, signed document with the client encryption key; and
transferring the encrypted, signed document to an electronic document vault associated with the signing user;
wherein the electronic document vault is itself encrypted and configured to provide safe, encrypted storage at an electronic storage location hosted by a document service, and control of verification or viewing the encrypted, signed document in the electronic document vault requires authorization from the signing user and the use of their client decryption key (a) to access the document, and (b) to display the document to a requesting third party, thereby allowing the requesting third party to view the electronic signature and use the electronic signature to verify the legitimacy of the document.

4. A computer-implemented method, comprising:
associating an unsigned, encrypted document with at least a first authenticated user code for a first signing user and a second authenticated user code for a second signing user;
sending the unsigned, encrypted document to the first signing user and the second signing user;
decrypting the unsigned, encrypted document with stored client decryption keys corresponding to the first and second signing users after the first and second signing users have accepted the unsigned, encrypted document;
generating electronic signature data from the first authenticated user code for the first signing user and the second authenticated user code for the second signing user;
appending the electronic signature data corresponding to each signing user to the decrypted unsigned document to produce a decrypted, signed document, wherein each signature may be represented by a visible image, a visible code, or embedded metadata;
assigning ownership of the decrypted, signed document to the first and second signing users;
retrieving client encryption keys from personal, individual, electronic vaults for the first and second signing users, and encrypting the signed document with the client encryption keys of the first signing user and the second signing user; and
transferring the encrypted, signed document to first and second electronic document vaults associated with the first and second signing users, respectively;
wherein each of the first and second electronic document vaults is itself encrypted and configured to provide safe, storage at an electronic storage location hosted by a third party document service, and control of verification or viewing of the encrypted, duplicated, signed document in the first and second electronic vaults requires authorization from at least one of the first signing user and the second signing user and the use of their respective client decryption key (a) to access the document, and (b) to display the document to a requesting third party, thereby allowing the requesting third party to view the electronic signature and use the electronic signature to verify the legitimacy of the document.

5. The method of claim 4 wherein each of the first and second electronic vaults is configured such that control of verification or viewing the encrypted, signed document in the first and second electronic vaults requires authorization from both the first and second signing users.

* * * * *